(12) United States Patent
Kaneko

(10) Patent No.: US 12,651,482 B2
(45) Date of Patent: Jun. 9, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kazue Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 18/178,420

(22) Filed: Mar. 3, 2023

(65) Prior Publication Data

US 2023/0290186 A1 Sep. 14, 2023

(30) Foreign Application Priority Data

Mar. 10, 2022 (JP) ................................. 2022-037601

(51) Int. Cl.
*G06V 40/40* (2022.01)
*G06T 7/90* (2017.01)
*G06V 10/56* (2022.01)

(52) U.S. Cl.
CPC ................ *G06V 40/40* (2022.01); *G06T 7/90* (2017.01); *G06V 10/56* (2022.01); *G06T 2207/10024* (2013.01); *G06T 2207/30196* (2013.01)

(58) Field of Classification Search
CPC ........ G06V 40/40; G06V 10/56; G06V 10/62; G06V 40/15; G06V 40/167; G06V 40/45; G06V 40/10; G06T 7/90; G06T 2207/10024; G06T 2207/30196
See application file for complete search history.

(56) References Cited

U.S. PATENT DOCUMENTS

| | | | | |
|---|---|---|---|---|
| 11,436,832 B2* | 9/2022 | Kon | ...................... | G06T 7/0012 |
| 2020/0054222 A1* | 2/2020 | Onishi | ................. | A61B 5/0075 |
| 2021/0160436 A1* | 5/2021 | Yildirim | ................ | H04N 5/265 |
| 2021/0209837 A1* | 7/2021 | Chen | ..................... | G06T 15/506 |
| 2022/0027447 A1* | 1/2022 | Keith, Jr. | .............. | G06F 21/606 |
| 2024/0013574 A1* | 1/2024 | Rodriguez | ............ | H04L 63/102 |
| 2025/0053629 A1* | 2/2025 | Tussy | .................... | G06V 40/50 |

FOREIGN PATENT DOCUMENTS

| | | |
|---|---|---|
| JP | 2016077539 A | 5/2016 |
| JP | 2020144445 A | 9/2020 |
| JP | 6944901 B2 | 10/2021 |

* cited by examiner

*Primary Examiner* — Andrew W Bee
*Assistant Examiner* — D J Dhooge
(74) *Attorney, Agent, or Firm* — Canon U.S.A., Inc. IP Division

(57) ABSTRACT

An image processing apparatus is configured to determine whether a person in an image is a living body. The image processing apparatus includes a processor, and a memory storing executable instructions which, when executed by the processor, cause the image processing apparatus to perform operations including determining, based on a time-series image acquired during a predetermined time period, a threshold indicating a skin color range, obtaining color information describing a skin color area in the time-series image based on the threshold, and controlling, based on the color information, whether to continue biometric determination processing for determining whether a person in the time-series image is a living body.

17 Claims, 12 Drawing Sheets

FIG.3

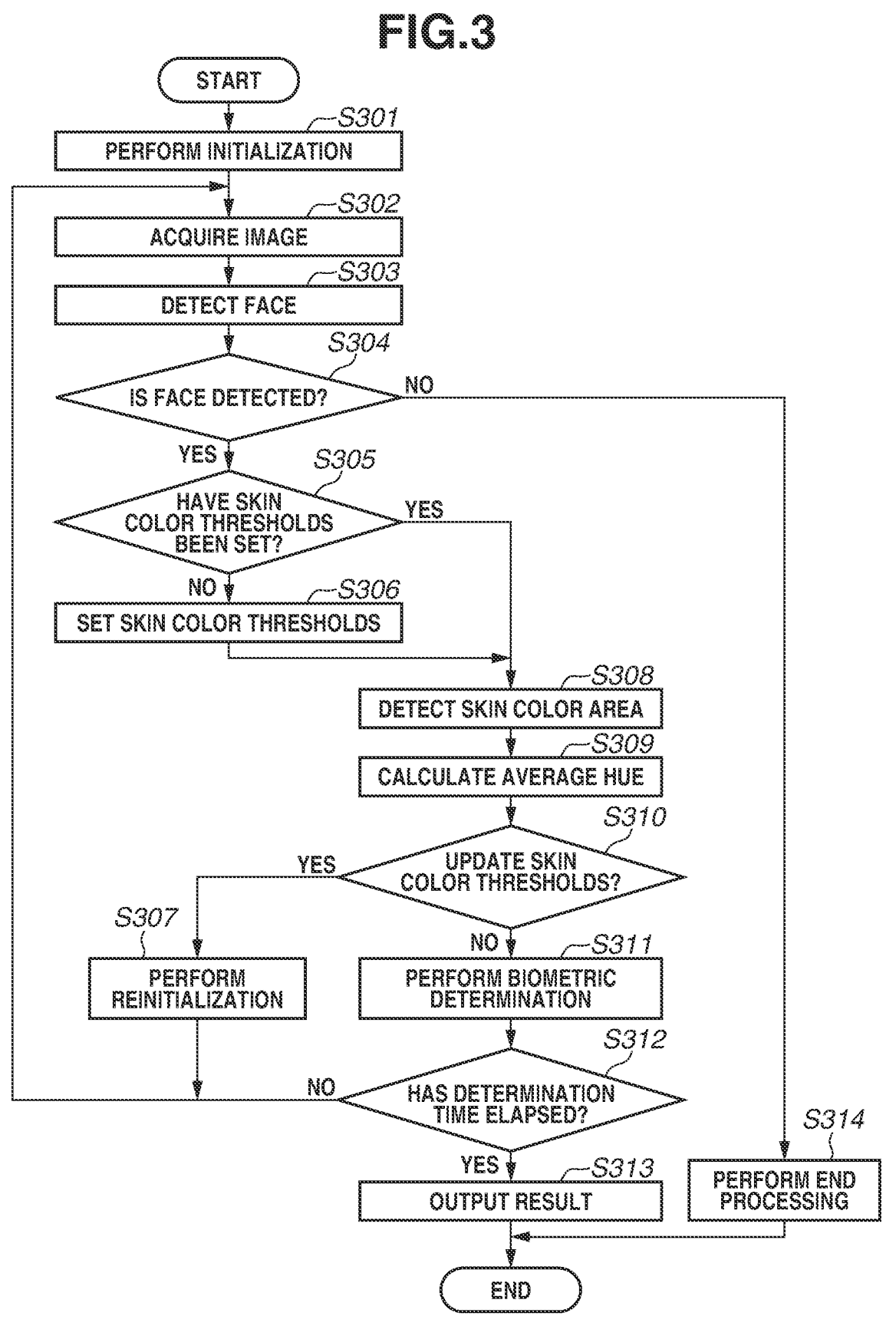

START

↓

PERFORM INITIALIZATION — S301

↓

ACQUIRE IMAGE — S302

↓

DETECT FACE — S303

↓

IS FACE DETECTED? — S304 — NO →

YES ↓

HAVE SKIN COLOR THRESHOLDS BEEN SET? — S305 — YES →

NO ↓

SET SKIN COLOR THRESHOLDS — S306

↓

DETECT SKIN COLOR AREA — S308

↓

CALCULATE AVERAGE HUE — S309

↓

UPDATE SKIN COLOR THRESHOLDS? — S310

YES → PERFORM REINITIALIZATION — S307

NO ↓

PERFORM BIOMETRIC DETERMINATION — S311

↓

HAS DETERMINATION TIME ELAPSED? — S312

NO →

YES ↓

OUTPUT RESULT — S313

PERFORM END PROCESSING — S314

↓

END

FIG. 11

IMAGE PROCESSING APPARATUS, IMAGE PROCESSING METHOD, AND STORAGE MEDIUM

BACKGROUND

Field

The present disclosure relates to a technique for determining whether a person in an image is a living body.

Description of the Related Art

There are biometric determination techniques for determining whether a person in an image or a video image is a living body.

If any of the lighting color, illuminance, and background color changes during biometric determination processing and the camera's automatic correction function is activated, the accuracy of the biometric determination processing can drop because of noise other than a change in skin color due to blood flow. Japanese Patent No. 6944901 discusses a method of stopping image correction by a camera's automatic correction unit upon start of pulse estimation. However, with the method discussed in Japanese Patent No. 6944901, the camera's automatic correction can function improperly and the accuracy of the biometric determination processing can drop in a situation where there is a change in the imaging conditions.

SUMMARY

The present disclosure is directed to efficiently performing a biometric determination in a situation where there is a change in imaging conditions.

According to an aspect of the present disclosure, an image processing apparatus is configured to determine whether a person in an image is a living body. The image processing apparatus includes a processor, and a memory storing executable instructions which, when executed by the processor, cause the image processing apparatus to perform operations including determining, based on a time-series image acquired during a predetermined time period, a threshold indicating a skin color range, obtaining color information describing a skin color area in the time-series image based on the threshold, and controlling, based on the color information, whether to continue biometric determination processing for determining whether a person in the time-series image is a living body.

Further features of the present disclosure will become apparent from the following description of exemplary embodiments with reference to the attached drawings.

BRIEF DESCRIPTION OF THE DRAWINGS

FIG. 3 is a flowchart illustrating processing performed by the image processing apparatus.

FIG. 11 is a diagram illustrating an example of biometric determination processing.

DESCRIPTION OF THE EMBODIMENTS

Exemplary embodiments of the present disclosure will be described below with reference to the drawings.

Biometric determination techniques include a method of clipping a face area, determining a change in skin color within the area, and measuring the period of the change to estimate a pulse rate. The biometric determination techniques also include a method of determining whether the change in skin color is due to a change in blood flow. In a first exemplary embodiment, biometric determination processing for determining whether a subject (a person) in a video image is a living body by estimating the pulse rate of the subject or detecting a change in the blood flow of the subject.

Figure 1:
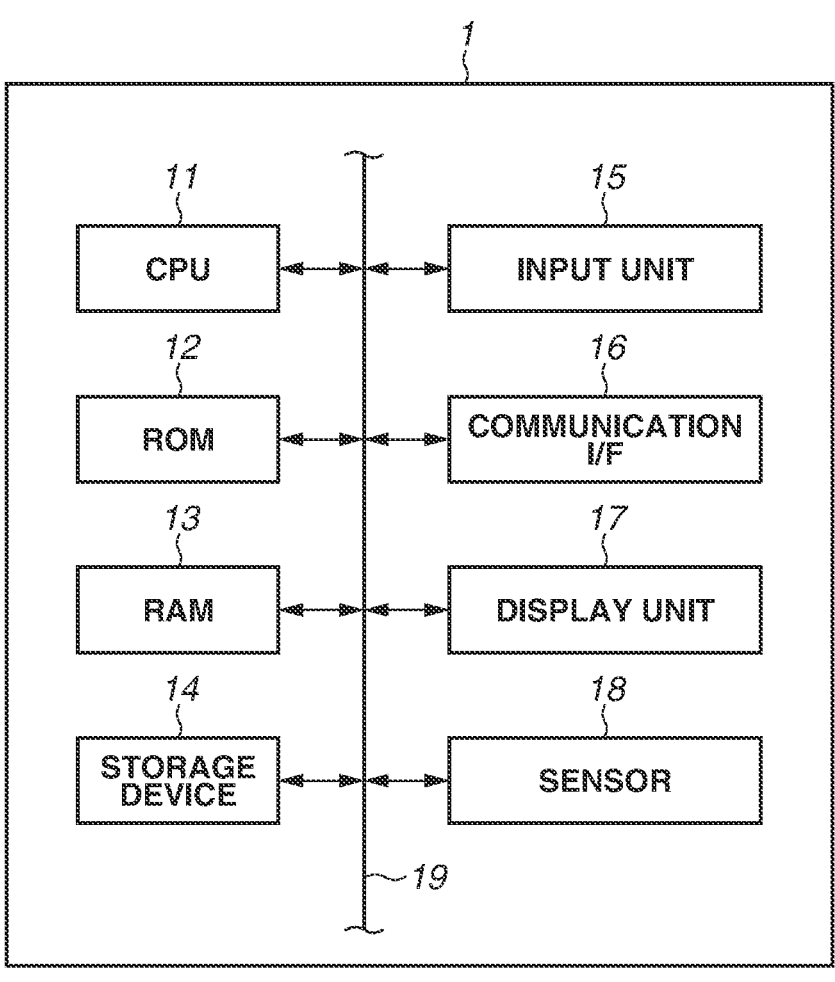
FIG. 1 is a block diagram illustrating a hardware configuration example of an image processing apparatus.

FIG. 1 is a block diagram illustrating a hardware configuration example of an image processing apparatus (a biometric determination apparatus) 1 according to the present exemplary embodiment. A central processing unit (CPU) 11 reads an operating system (OS) and other programs stored in a read-only memory (ROM) 12 and a storage device 14 and executes the programs using a random access memory (RAM) 13 as a work memory, controls the components connected to a system bus 19, and performs calculations and makes logical determinations for various types of processing. The processing performed by the CPU 11 includes the biometric determination processing according to the present exemplary embodiment. The storage device 14 is a hard disk drive or an external storage device, and stores programs and various types of data related to image processing according to the present exemplary embodiment. An input unit 15 includes an image capturing device such as a camera, and an input device for inputting user instructions, such as buttons, a keyboard, or a touchscreen. The storage device 14 is connected to the system bus 19 via an interface such as a Serial Advanced Technology Attachment (SATA) interface, and the input unit 15 is connected to the system bus 19 via a serial bus such as a Universal Serial Bus (USB). Details of these will be omitted. A communication interface (I/F) 16 communicates with an external device by wireless communication. A display unit 17 is a display. A sensor 18 is an image sensor or a distance sensor. The biometric determination apparatus 1 may not necessarily include all the pieces of hardware described above. For example, if the biometric determination apparatus 1 is a network camera, the input device such as a keyboard and the display unit 17 may or may not be included therein.

Figure 2:
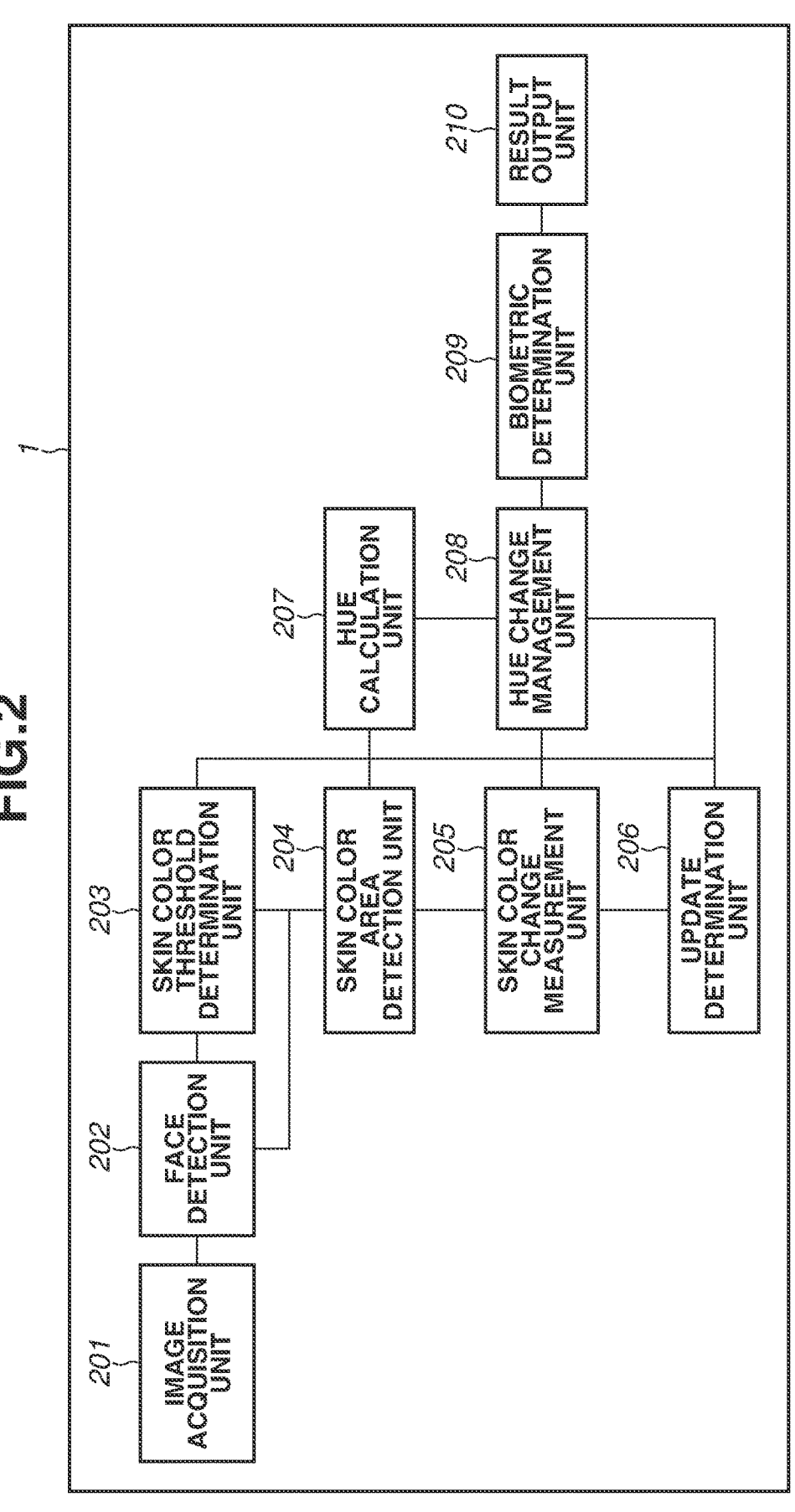
FIG. 2 is a block diagram illustrating a functional configuration example of the image processing apparatus.

FIG. 2 is a block diagram illustrating a functional configuration example of the image processing apparatus 1 according to the present exemplary embodiment. The image processing apparatus (the biometric determination apparatus) 1 performs a "biometric determination (spoofing determination)" to determine whether a subject is a living body, using color information detected from an image. The image processing apparatus 1 includes an image acquisition unit 201, a face detection unit 202, a skin color threshold determination unit 203, a skin color area detection unit 204, a skin color change measurement unit 205, an update determination unit 206, a hue calculation unit 207, a hue change management unit 208, a biometric determination unit 209, and a result output unit 210.

The image acquisition unit 201 acquires a captured image of a target person. In the present exemplary embodiment, the image acquisition unit 201 acquires a time-series image (a video image) captured by an image capturing device capable of network communication. As employed herein, the time-series image refers to a group of images captured in a specific period.

The face detection unit 202 detects a face from the captured image. An existing image recognition technique is used for the face detection. More specifically, a face detector including a neural network trained with face images is used to detect a rectangle indicating the position and size of the face in the image. Alternatively, the position of the face in the image is detected by matching processing using face image templates. Further alternatively, a face image may be obtained by generating a screen for guiding the target person into a predetermined angle of view and extracting a face area from an image captured when the person appears within the frame of the screen. As employed herein, the face image refers to a rectangular partial image that includes a face and is extracted from an image. Thus, the color information and feature amount extracted from the face image refer to information indicating the face of the person and a detailed description thereof will be omitted.

The skin color threshold determination unit 203 determines thresholds for a target color in the input video image based on the color information about the face area. The thresholds determined by the skin color threshold determination unit 203 will be referred to as the "skin color thresholds" because the target color is a human skin color. The skin color thresholds indicate the definition of the skin color in the image, and define a condition for identifying skin color pixels in the image based on the hue, saturation, and value in the color information. The method for determining the skin color thresholds will be described below. The skin color area detection unit 204 obtains a partial image (a skin color area) to be used for the biometric determination from the image based on the determined thresholds for the target color. The hue calculation unit 207 makes hue calculations based on the color information of each pixel in the obtained skin color area, and determines an average of hue values of all the pixels (hereinafter referred to as an average hue). The skin color change measurement unit 205 measures the amount of change in the number of pixels in the skin color area detected by the skin color area detection unit 204 and the amount of change in the average hue determined by the hue calculation unit 207. The update determination unit 206 determines whether to update the skin color thresholds based on the amounts of change measured by the skin color change measurement unit 205. If the skin color thresholds are determined to be updated, the update determination unit 206 instructs the skin color threshold determination unit 203 to redetermine the skin color thresholds based on an image after the determination, and instructs the hue change management unit 208 to exclude the amount of change in the average hue so far from the target of the biometric determination processing.

The hue change management unit 208 calculates the amount of change in the average hue based on hues calculated from a plurality of frames, and records the calculated amount of change. The biometric determination unit 209 determines whether the subject is a living body based on the calculated amount of change in the average hue. The biometric determination unit 209 may perform pulse estimation processing for estimating the pulse rate of the subject based on the color information. Alternatively, the biometric determination unit 209 may determine whether the subject is a living body by detecting the blood flow of the subject. The result output unit 210 outputs the result of the determination as to whether the subject (the person) in the image is a living body. In other words, the result output unit 210 outputs the result of the determination as to whether the subject is "spoofing" using a picture or a display terminal.

The color information used for the biometric determination and the color information used for the skin color threshold update determination are not limited to hue (H) in a hue, saturation, value (HSV) color space. Green (G) in a red, blue, green (RGB) color space or other elements in other color spaces may be used.

Next, processing performed by the functional units will be described with reference to a flowchart of FIG. 3. All the steps to be described with reference to the flowchart may not necessarily be performed.

In step S301, the image processing apparatus 1 performs initialization. More specifically, the skin color threshold determination unit 203 clears skin color threshold settings. The hue change management unit 208 sets a biometric determination start time. In step S302, the image acquisition unit 201 acquires an image. In step S303, the face detection unit 202 detects a face from the image. In step S304, the face detection unit 202 determines whether a face is detected from the image. If no face is detected (NO in step S304), the processing proceeds to step S314. In step S314, end processing is performed to terminate the flowchart. If no face is detected from the first image, then in the end processing, the result output unit 210 outputs a result indicating that the biometric determination is not started. Alternatively, the result output unit 210 may provide a notification that a target person for the determination is not detected. If a face is not detected from an image during the biometric determination processing on a certain person, the result output unit 210 outputs a result indicating that the biometric determination processing is aborted. In a case where a series of images where the presence of a face is guaranteed is input, the processing of steps S304 and S314 may be skipped.

In step S304, if a face is detected by the face detection unit 202 (YES in step S304), the processing proceeds to step S305. In step S305, the skin color threshold determination unit 203 determines whether the skin color thresholds have been set. If the skin color thresholds have not been set (NO in step S305), the processing proceeds to step S306. In step S306, the skin color threshold determination unit 203 sets the skin color thresholds. The skin color thresholds define a possible HSV range based on the color information in the HSV color space obtained from the RGB values of the pixels in the skin color area of the face image.

The skin color thresholds may be determined using averages and variances of the respective RGB signals in the face-detected area, or using values obtained by conversion into the HSV color space. The skin color thresholds are set for each detected face. For simplicity of description, suppose here that the face of one person is detected and the skin color thresholds are set for this person. If the skin color thresholds are determined to have been set in step S305 (YES in step S305), the processing proceeds directly to step S308 without going through step S306.

In step S308, the skin color area detection unit 204 detects a skin color area using the determined skin color thresholds, and calculates the number of pixels in the skin color area (hereinafter also referred to as the number of skin color pixels). More specifically, the skin color area detection unit 204 counts the number of pixels where the information in the HSV color space falls within the skin color thresholds, among the pixels of the image.

In step S309, the hue calculation unit 207 calculates the average hue based on the color information of the pixels in the skin color area.

In step S310, the update determination unit 206 determines whether to update the skin color thresholds based on the color information. More specifically, the update determination unit 206 determines whether the set skin color thresholds are appropriate, based on a change in the number of skin color pixels calculated in step S308 and a change in skin color which is a change in the average hue calculated in step S309. Details of this processing will be described below with reference to FIG. 4.

In step S310, if the skin color thresholds are determined not to be updated (determined to be appropriate) (NO in step S310), the processing proceeds to step S311. In step S311, the biometric determination unit 209 determines whether the person as the subject is a living body, based on the time-series image captured in a predetermined period and the set skin color thresholds. In other words, the biometric determination unit 209 performs the biometric determination processing (the biometric determination). In the biometric determination processing, the determination may be based on a biometric score indicating the likelihood of the person in the image being a living body. In the biometric determination processing, if the biometric score is higher than or equal to a specific reference value, the biometric determination unit 209 determines that the person is a living body. If the biometric score is lower than the specific reference value, the biometric determination unit 209 determines that the person is not a living body. For example, the biometric score is estimated based on the pulse rate estimated based on the average hue in the color information. More specifically, the biometric determination processing may include pulse estimation processing. The pulse estimation processing is a method of estimating the pulse rate of the subject based on the color information obtained from the time-series image. For example, the amount of change in the average hue over time is fast Fourier transformed and the peak frequency of the resulting spectrum is determined as the pulse rate. The biometric score is determined by dividing the power at the peak frequency by the average of the powers at the other frequencies. If the biometric score is higher than or equal to the specific reference value, the subject is determined to be a living body. If the biometric score is lower than the specific reference value, the subject is determined to be not a living body. Another example of the biometric determination processing is blood flow detection using the amplitudes of a plurality of pieces of oscillating color information or the amount of change over time. The method for estimating the blood flow can make the determination using fewer frames than the pulse estimation. If, in step S312, a time (a determination time) to perform the biometric determination has not elapsed, the biometric score at a time point in the time-series image may be output. After a lapse of the determination time, the subject may be determined to be a living body if a statistic value (such as a maximum value, an average, or a median) of the biometric scores output during the determination time is higher than or equal to a specific value.

In step S312, the result output unit 210 determines the time elapsed from the biometric determination start time, and determines whether the determination time for the biometric determination has elapsed. If the determination time has elapsed (YES in step S312), the processing proceeds to step S313. In step S313, the result output unit 210 outputs the result of the biometric determination processing on the person in the time-series image, and the processing ends. If the determination time has not elapsed (NO in step S313), the processing returns to step S302 to repeat the biometric determination processing. The biometric determination used in this example is made even if the determination time (PT1) has not elapsed. However, the biometric determination is characterized by having low reliability when the determination time has not elapsed, and having high reliability when the determination time has elapsed. If the biometric determination is of a type that can be made only after a predetermined time for the biometric determination elapses, steps S311 and S312 are reversed in order.

If the skin color thresholds are determined to be inappropriate (YES in step S310), the processing proceeds to step S307. In step S307, the image processing apparatus 1 performs reinitialization. More specifically, the image processing apparatus 1 clears the skin color threshold settings, updates the biometric determination start time, and excludes the amount of change in the average hue over time (so far) from the target of the biometric determination processing. In step S302, the image acquisition unit 201 acquires an image, and the processing is repeated. Immediately after the reinitialization, the skin color thresholds are reset, i.e., updated based on the next image since the skin color threshold settings have been cleared. More specifically, in step S306, the skin color thresholds are updated based on the image acquired after the image for which the skin color thresholds are determined to be inappropriate. In such a manner, whether the skin color thresholds are appropriate is determined image by image, whereby the accuracy of the biometric determination can be prevented from dropping even in a situation where there is a change in the imaging conditions.

In this flowchart, after the lapse of the determination time, the result of the biometric determination is output and the processing ends. Alternatively, the image processing apparatus 1 may continue to output the result of the spoofing determination (the biometric determination). Further alternatively, at timing when the result of the spoofing determination is output, the image processing apparatus 1 may determine whether to continue the biometric determination processing by having the user input an instruction about whether to continue the biometric determination processing. The result output unit 210 may output the result of the pulse rate estimation instead of the result of the biometric determination. This enables using the pulse rate as a criterion for determining the health condition of the subject as well as a criterion for the biometric determination.

Figure 4:
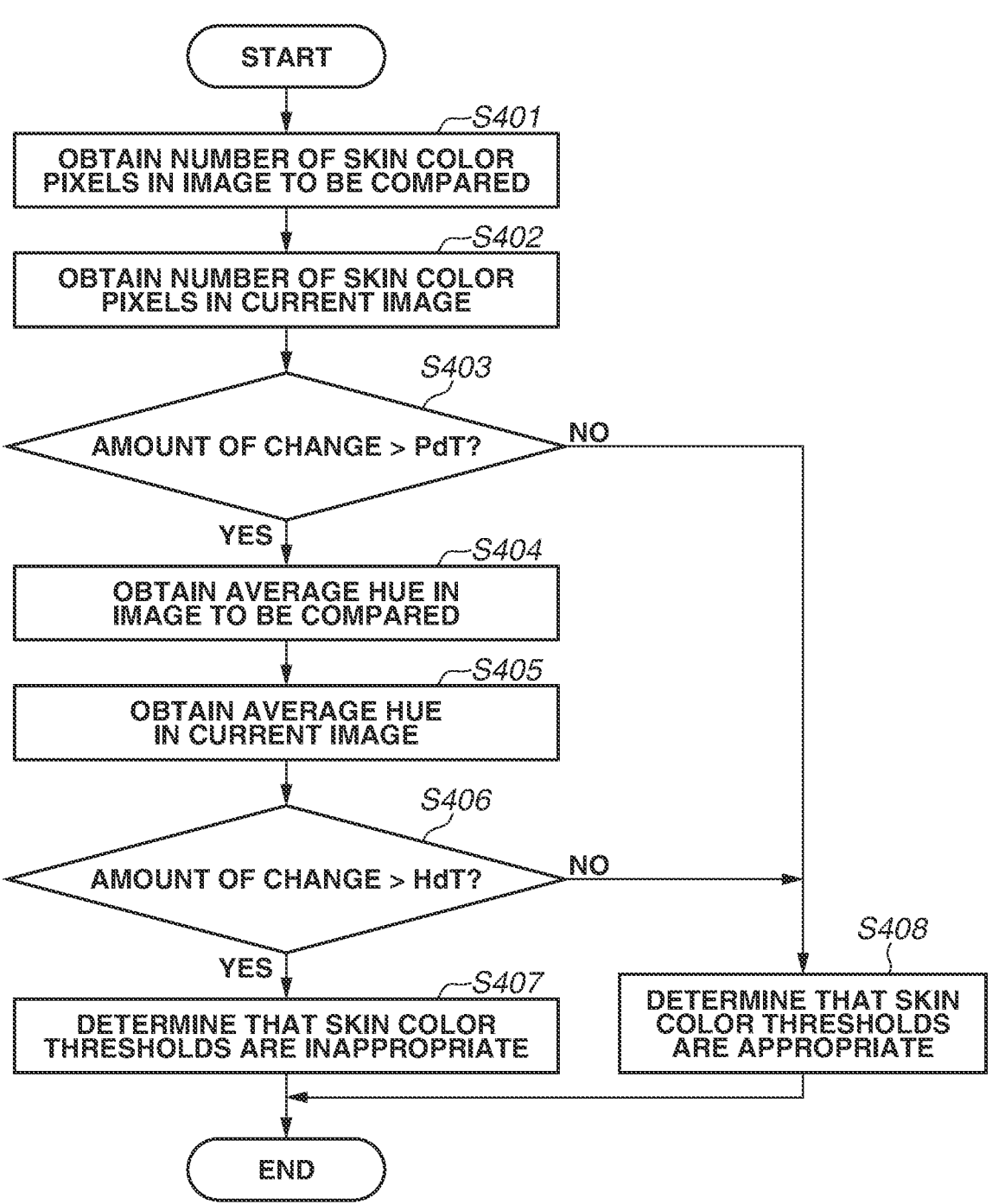
FIG. 4 is another flowchart illustrating the processing performed by the image processing apparatus.

FIG. 4 is a flowchart illustrating an example of processing for determining the appropriateness of the skin color thresholds in step S310 of FIG. 3.

In this flowchart, the skin color thresholds are determined to be inappropriate if both the number of skin color pixels and the average hue change by more than predetermined amounts within a predetermined time (hereinafter referred to as a change observation time) shorter than the determination time for the biometric determination processing. It is assumed here that the determination time for the biometric determination is PT1 (seconds) and the predetermined time for the threshold update determination (i.e., the change observation time) is PT2 (seconds). In the case of the biometric determination, a relation of PT1>PT2>0 is satisfied. In the case of the pulse estimation, the change observation time is not limited thereto since the change observation time may be longer or shorter than the determination time for the biometric determination processing.

In step S401, the update determination unit 206 obtains the number (P0) of pixels in the skin color area of an image to be compared. For example, an image acquired the predetermined time (PT2) before the current time (referred to as a first time) is used as the image to be compared. If the predetermined time (PT2) has not elapsed since the start of the biometric determination, the update determination unit 206 obtains the number of pixels in the skin color area of an image acquired at the start (T=0) of the biometric determination. In this step, the update determination unit 206 uses an image where the skin color area is determined based on the preset skin color thresholds.

In step S402, the update determination unit 206 obtains the number (P1) of pixels in the skin color area of the current image.

In step S403, the update determination unit 206 determines whether the amount of change (Pd) in the number of pixels in the skin color area of the image acquired in the predetermined time (PT2) is greater than a first predetermined value (a skin color pixel number change threshold or PdT). An example of an equation for determining the amount of change (Pd) between the number (P0) of pixels in the skin color area of the image acquired the predetermined time (PT2) before the current time and the number (P1) of pixels in the skin color area of the current image is as follows:

$$Pd=\mathrm{abs}(P0-P1)/\min(P0,P1).$$

The reason why the amount of change (Pd) is an absolute value is that noise other than a change in skin color due to blood flow can occur even in a case where the skin color area increases. Examples of the noise include disappearance of a shadow area on the face and confusion of the background with the skin.

If the amount of change (Pd) in the number of skin color pixels is less than or equal to the first predetermined value (PdT) (NO in step S403), the processing proceeds to step S408. In step S408, the update determination unit 206 determines that the skin color thresholds are appropriate, and the processing ends. If the amount of change (Pd) in the number of skin color pixels is determined to be greater than the first predetermined value (PdT) (YES in step S403), the processing proceeds to step S404.

In step S404, the update determination unit 206 obtains an average hue (H0) of the skin color area of the image to be compared. At this time, the update determination unit 206 obtains the average hue (H0) in the image acquired the predetermined time (PT2) before the current time (the first time). If the predetermined time (PT2) has not elapsed since the start of the biometric determination, the update determination unit 206 obtains the average hue (H0) at the start of the biometric determination. In step S405, the update determination unit 206 obtains an average hue (H1) of the skin color area of the image acquired at the first time.

In step S406, the update determination unit 206 determines whether the amount of change (Hd) in the average hue is greater than a second predetermined value (a hue change threshold or HdT). An example of an equation for determining the amount of change (Hd) between the average hue (H0) of the skin color area of the image acquired the predetermined time (PT2) before the current time and the average hue (H1) of the skin color area of the current image is as follows:

$$Hd=\mathrm{abs}(H0-H1).$$

If the amount of change (Hd) in the average hue is less than or equal to the second predetermined value (HdT) (NO in step S406), the processing proceeds to step S408. In step S408, the update determination unit 206 determines that the skin color thresholds are appropriate, and the processing of step S310 ends. If the amount of change (Hd) in the average hue is determined to be greater than the second predetermined value (HdT) (YES in step S406), the processing proceeds to step S407. In step S407, the update determination unit 206 determines that the skin color thresholds are inappropriate, and the processing of step S310 ends.

In this example, the amounts of change are obtained based on differences in color information between the image acquired at the current time (the first time) and the image acquired the predetermined time (PT2) before the current time, but any other method may be used. For example, the amounts of change may be obtained based on the color information in the image acquired at the start of the predetermined time (PT2) and the color information in the image acquired at the end of the predetermined time (PT2). Alternatively, the amount of change in the number of skin color pixels may be obtained based on a difference between the maximum and minimum values of the number of pixels in the skin color area in the color information in the time-series image acquired in the predetermined time (PT2). The same applies to hue. More specifically, the update determination unit 206 may determine whether the amount of change in the average hue of the skin color area is greater than the second predetermined value (HdT) based on the average hue of the skin color area of the time-series image at the start of the predetermined time (PT2) and the average hue of the skin color area of the time-series image at the end of the predetermined time (PT2).

A variation of the reinitialization performed in step S307 in a case where the skin color thresholds are determined to be inappropriate will be described. A method of reducing a drop in the accuracy of the biometric determination by changing the target period of the biometric determination will now be described. Suppose that an imaging condition changes once and return to the original condition after a lapse of time, and various evaluation values calculated from the color information have become close to those at the start of the biometric determination. In such a case, the skin color thresholds are likely to have become appropriate again. However, images acquired in the period where the color information changes greatly contain noise, other than a change in skin color due to blood flow, in the amount of change in the average hue. Thus, excluding such images from the target of the biometric determination processing can improve the determination accuracy. In such a case, in the reinitialization processing of step S307, the biometric determination start time is updated without updating the skin color thresholds. For example, in the reinitialization, the start time of the biometric determination processing is delayed by a specific time (e.g., a time corresponding to the number of frames (n-frames) between the time of start and the time when the reinitialization occurs). The amount of change in the average hue over time (so far) may be excluded from the target of the biometric determination processing. Updating the biometric determination start time means resetting the time counter after the processing corresponding to n-frames to zero. In other words, the determination time is extended by a time corresponding to n-frames. This also means that the amount of change in the average hue over time (so far) is excluded from the processing target.

FIGS. 5A to 5E illustrate a comparison of progress of processing between a case where the processing is still continued even after the skin color thresholds have become inappropriate and a case where the reinitialization is performed.

Figures 5A, 5B, 5C, 5D, 5E:
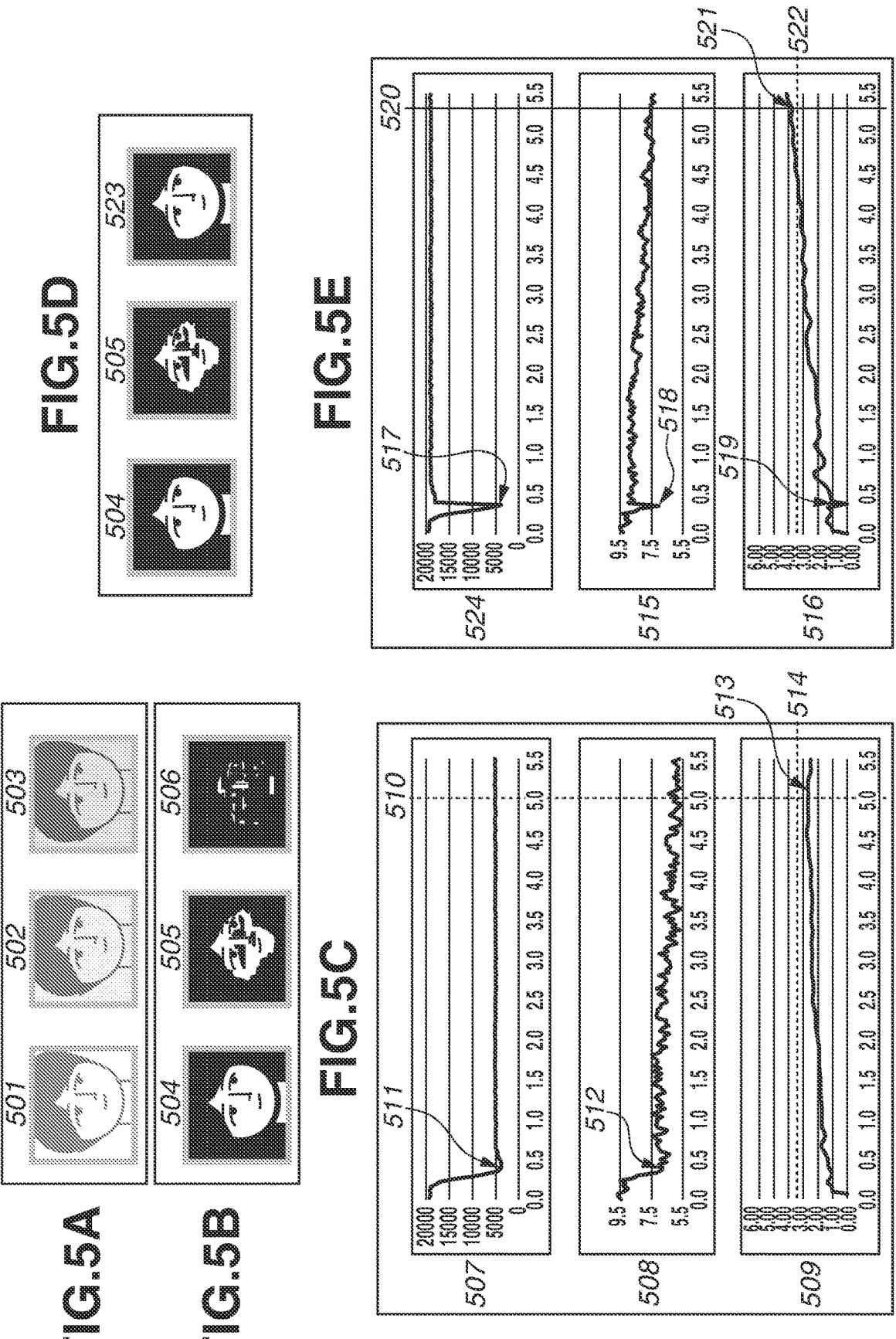
FIGS. 5A to 5E are diagrams illustrating examples of biometric determination processing.

FIG. 5A illustrates a group of acquired images 501 to 503. A situation where the brightness increases immediately before the biometric determination will now be described as an example. In such a case, the camera's automatic correction is activated with a delay depending on the amount of change in the imaging environment. For example, the camera determines that the first image (the acquired image 501) is too bright and performs control to reduce the image brightness. The acquired images 501 to 503 are images captured during imaging, and indicate how the image brightness is changed by the camera's automatic correction. The following description is given on the assumption that the persons in the captured images are the same and there has been no significant change in the imaging environment since the increase in brightness after the determination of the skin color thresholds.

FIGS. 5B and 5C illustrate an example where the processing is still continued even after the skin color thresholds have become inappropriate. FIG. 5B illustrates results of detecting the skin color area using the skin color thresholds set for the first image (501) of the acquired images 501 to 503. Images 504, 505, and 506 are the results of detecting the skin color area from the acquired images 501, 502, and 503, respectively. White portions represent the areas determined to be in the skin color. In the image 504, the skin color area determined using the skin color thresholds set for the acquired image 501 covers the entire face. In the images 505 and 506, the skin color area is smaller.

FIG. 5C illustrates graphs of changes in the color information and the biometric score over time. A graph 507 illustrates the number of skin color pixels, a graph 508 illustrates the average hue, and a graph 509 illustrates the biometric score.

A broken line 510 indicates the determination time of 5 seconds for the biometric determination in this case. In the case of performing the pulse estimation and performing the biometric determination using the result of the pulse estimation, the determination time is desirably set to approximately 5 seconds for the sake of accuracy. If the biometric determination is performed using the amplitudes of a plurality of pieces of oscillating color information and the correlation with the amount of change over time without determining the pulse rate, the determination time can be different and is not limited to 5 seconds.

In the graph 507, the number of skin color pixels decreases in a period from the start to a time point 511 when 0.3 seconds have elapsed. In the graph 508, the average hue decreases in a period from the start to a time point 512 when 0.3 seconds have elapsed. In the graph 509, the biometric score at a time point 513 after the determination time of 5 seconds have elapsed is 2.66, which is lower than a threshold of 3.4 (indicated by a broken line 514) for determining the person as a living body, and the person is thus determined to be spoofing. This indicates that, because a series of automatic corrections starting from the acquired image 501 is still in progress, the skin color area has not successfully been extracted from the acquired images 502 and 503 and, as a result, the estimation accuracy of the amount of change in the color information drops.

FIGS. 5D and 5D illustrate an example where the reinitialization is performed in a case where the skin color thresholds have become inappropriate. In this example, the reinitialization is performed if the number of skin color pixels changes by more than 16% and the average hue changes by more than 2 during the change observation time of 3 seconds. In this example as well, the determination target images are the acquired images 501 to 503 of FIG. 5A. The images 504 and 505 and an image 523 in FIG. 5D represent results of extracting the skin color area.

FIG. 5D illustrates the results of extracting the skin color area. The images 504 and 505 are the same as those in FIG. 5B. In this case, the biometric determination processing is reinitialized in the middle, whereby skin color thresholds different from those for the acquired image 501 are set for the acquired image 503. The image 523 illustrates the skin color area extracted from the acquired image 503. It can be seen that the skin color area is wider in the image 523 than in the image 506 of FIG. 5B.

FIG. 5E illustrates graphs of changes in the color information and the biometric score over time. A graph 524 illustrates the number of skin color pixels, a graph 515 illustrates the average hue, and a graph 516 illustrates the biometric score. In the graph 524, the number of skin color pixels decreases by 75% at a time point 517. In the graph 515, the average hue decreases by 2.1 at a time point 518. When both of the changes in the number of skin color pixels and the average hue satisfy the above-described condition like this example, the reinitialization is performed. More specifically, the skin color threshold settings are cleared, the biometric determination start time is updated, and the amount of change in the average hue over time (so far) is excluded from the target of the biometric determination processing. The skin color thresholds are reset based on the next image. The image 523 represents the result of detecting the skin color area using the reset skin color thresholds. In the graph 524, the number of skin color pixels is close to the original value after the time point 517. Also in the graph 515, the average hue is close to the original value after the time point 518. In the graph 516, the biometric score drops to 0 once at a time point 519 because the amount of change in the average hue so far is excluded from the target. Because the biometric determination start time is reset after a lapse of 0.3 seconds, the result of the biometric determination is output after a lapse of 5.3 seconds. The biometric score at a time point 521 is 3.69, which is higher than the threshold of 3.4 indicated by a broken line 522, and the person is thus determined to be a living body.

If the reinitialization is performed, the result is output after the lapse of the spoofing determination time to which the reinitialization time is added. However, if the biometric score reaches a sufficient value before the lapse of the determination time to which the reinitialization time is added, the result may be output at that point in time. This can reduce the time taken for the biometric determination processing.

As described above, if the skin color thresholds for extracting the skin color area have become inappropriate, the reinitialization is performed. This makes it possible to perform the biometric determination efficiently even in a situation where there is a change in the imaging conditions.

In the first exemplary embodiment, the reinitialization is performed only if both the change in the number of skin color pixels and the change in the average hue are greater than the respective predetermined values. A second exemplary embodiment deals with an example of changing the condition for the reinitialization and an interval for the reinitialization. In the first exemplary embodiment, the condition for the reinitialization is that the reinitialization is performed only if both the amount of change in the number of skin color pixels and the amount of change in the average hue are large. Alternatively, the reinitialization may be performed if one of the amounts of change exceeds the predetermined value. An example will now be described where a reinitialization standby time is provided depending on the amount of change in the color information because the determination time for the biometric determination processing increases if the frequency of performing the reinitialization is too high.

Figure 6:
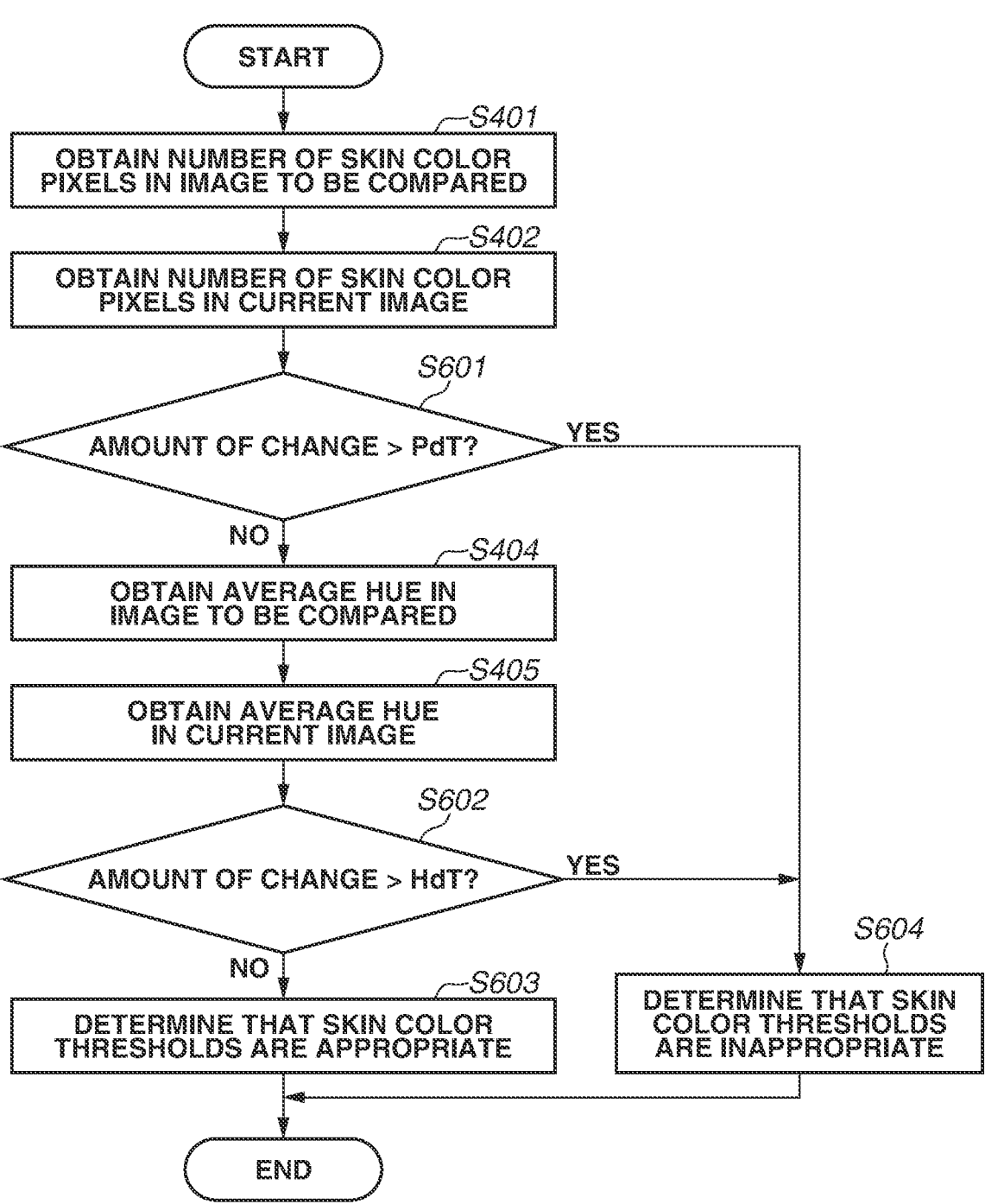
FIG. 6 is a flowchart illustrating processing performed by an image processing apparatus.

FIG. 6 is a flowchart illustrating processing performed by the image processing apparatus 1 according to the present exemplary embodiment. The image processing apparatus 1 has a hardware configuration and a functional configuration similar to those in the first exemplary embodiment. In FIG. 6, processing of steps S401, S402, S404, and S405 is similar to that in the flowchart of FIG. 4. A description thereof will thus be omitted. In step S601, if the update determination unit 206 determines that the amount of change in the number of skin color pixels is greater than the skin color pixel number change threshold (PdT) (YES in step S601), the processing proceeds to step S604. In step S604, the update determination unit 206 determines that the skin color thresholds are inappropriate. If the update determination unit 206 determines that the amount of change in the number of skin color pixels is not greater than the skin color pixel number change threshold (PdT) (NO in step S601), the processing proceeds to step S404. In steps S404 and S405, the update determination unit 206 checks the amount of change in the average hue. In step S602, if the update determination unit 206 determines that the amount of change in the average hue is greater than the hue change threshold (HdT) (YES in step S602), the processing proceeds to step S604. In step S604, the update determination unit 206 determines that the skin color thresholds are inappropriate. If the update determination unit 206 determines that the amount of change in the average hue is not greater than the hue change threshold (HdT) (NO in step S602), the processing proceeds to step S603. In step S603, the update determination unit 206 determines that the skin color thresholds are appropriate.

To combine the processing of FIG. 4 and the processing of FIG. 6, the change observation time (PT2) and the first predetermined value (the skin color pixel number change threshold or PdT) for making the determination of the amount of change in the number of skin color pixels may be changed based on the following conditions 1) and 2):

1) Both the change in the number of skin color pixels and the change in the average hue in the change observation time (PT2) are greater than the respective first change thresholds (the first predetermined value (PdT) and the second predetermined value (HdT)), and
2) When a second change observation time (PT3, where PT3<PT2) shorter than the change observation time (PT2) has elapsed, one of the change in the number of skin color pixels and the change in the average hue is greater than a second change threshold (a third predetermined value) greater than the first change threshold.

The update determination unit 206 normally checks both the change in the number of skin color pixels and the change in the average hue. If either the number of skin color pixels or the average hue changes sharply, the update determination unit 206 checks that change.

In the present exemplary embodiment, if the reinitialization is performed, a standby time IT for the next reinitialization is provided. If the biometric determination processing is initialized, the update determination unit 206 of the image processing apparatus 1 determines to continue the biometric determination processing without performing the reinitialization until the standby time IT elapses. For example, if the reinitialization is performed at time T1, the image processing apparatus 1 does not perform the reinitialization during the standby time IT. More specifically, the determination processing in step S310 of FIG. 3 is skipped on images acquired between time T1 and time (T1+IT), and the processing proceeds to step S311. As exception handling, the reinitialization may be performed during the standby time IT if the amount of change in the color information is so large that the effect of image quality adjustment is not negligible. This may be combined with the foregoing conditions to change the determination processing of step S310 depending on the conditions concerning the amount of change in the color information and the standby time IT. A specific example will now be described.

FIGS. 7A to 7E illustrate a comparison of progress of processing between a case where the processing is still continued even after the skin color thresholds have become inappropriate and a case where the reinitialization is performed after the skin color thresholds have become inappropriate.

Figure 7:
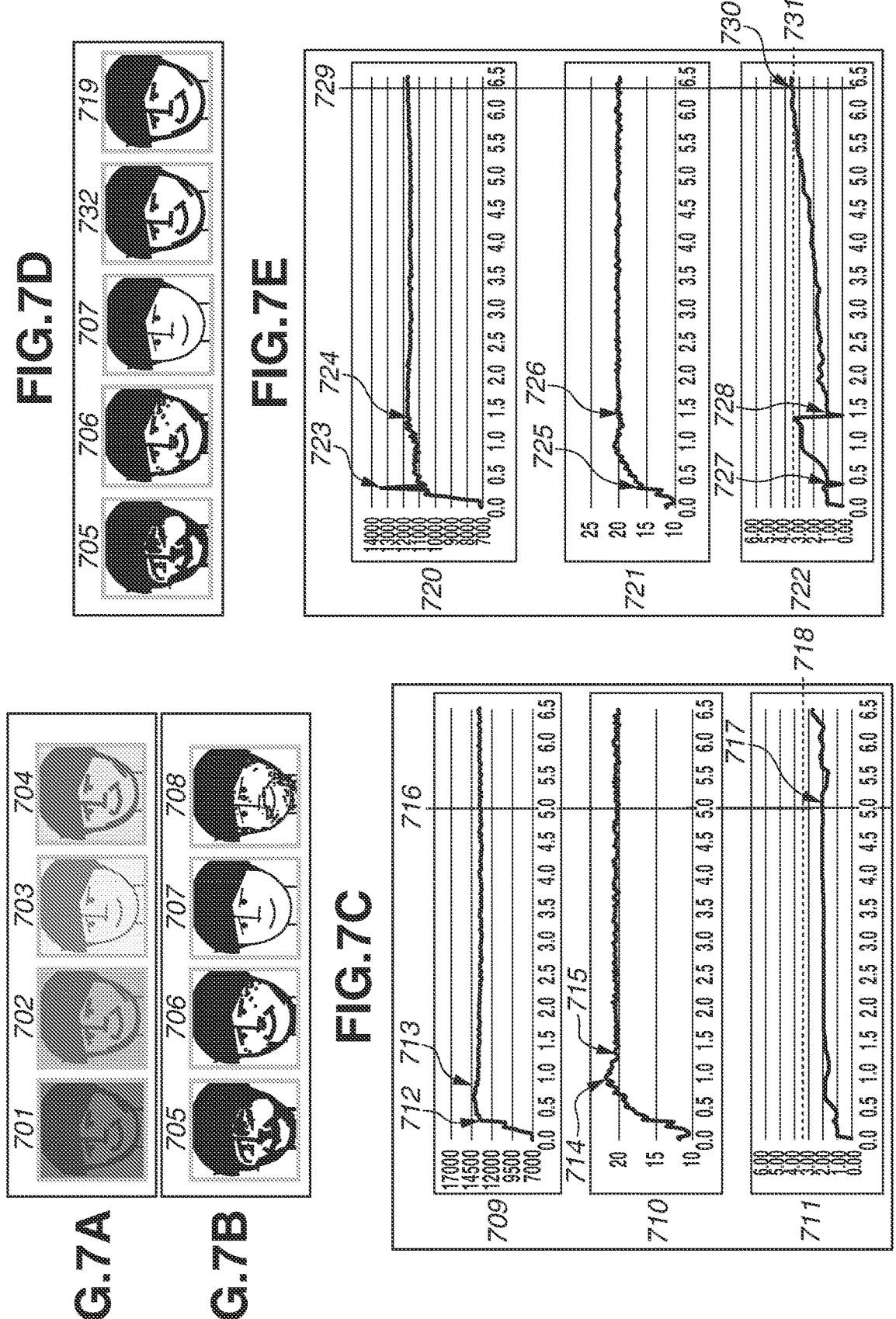
FIGS. 7A to 7E are diagrams illustrating examples of biometric determination processing.

FIG. 7A illustrates a group of acquired images 701 to 704. In this example, the brightness and lighting color change immediately before the biometric determination. The camera's automatic correction is activated, whereby the first image (the acquired image 701) is determined to be too dim and the brightness is increased. The lighting color is changed and thus the skin color also changes. The acquired images 701 to 704 are images extracted during the change.

FIG. 7B illustrates results of detecting the skin color area using the skin color thresholds set for the first image (701) of the acquired images 701 to 704. Images 705, 706, 707, and 708 are the detection results from the acquired images 701, 702, 703, and 704, respectively. White portions represent the areas determined to be in the skin color. In the image 705, the skin color area determined using the skin color thresholds set for the acquired image 701 includes a lot of shadow portions. The skin color area increases and the shadow area decreases in the images 706 and 707. In the image 708, the skin color thresholds are unable to accommodate the change in color, and portions other than the skin color portion appear on the face.

FIG. 7C illustrates graphs of changes in the color information and the biometric score over time. A graph 709 illustrates the number of skin color pixels, a graph 710 illustrates the average hue, and a graph 711 illustrates the biometric score. A solid line 716 indicates the determination time of 5 seconds for the biometric determination. In the graph 709, the number of skin color pixels increases in a period from the start to a time point 712 when 0.3 seconds have elapsed, and further increases slightly up to a time point 713.

In the graph 710, the average hue increases in a period from the start to a time point 714 when 1 seconds have elapsed, and then decreases in a period from the time point 714 to a time point 715. In the graph 711, the biometric score at a time point 717 after the determination time of 5 seconds has elapsed is 2.12, which is lower than a threshold of 3.4 indicated by a broken line 718, and the person is thus determined to be spoofing.

FIGS. 7D and 7E illustrate an example where the reinitialization is performed in a case where the skin color thresholds have become inappropriate. In this example, the reinitialization is performed when one of the following two conditions 1) and 2) is satisfied:

1) The number of skin color pixels changes by more than 16% and the average hue changes by more than 2 during a change observation time (a first standby time) of 3 seconds, and 2) When a change observation time (a second standby time) of 1 seconds has elapsed, the number of skin color pixels changes by more than 30% or the average hue changes by more than 3.

FIG. 7D illustrates results of detecting the skin color area. The images 705, 706, and 707 are the same as those in FIG. 7B. FIG. 7E illustrates graphs of changes in the color information and the biometric score over time. A graph 720 illustrates the number of skin color pixels, a graph 721 illustrates the average hue, and a graph 722 illustrates the biometric score. In the graph 720, the number of skin color pixels increases by 90% at a time point 723 when 0.3 seconds have elapsed. In the graph 721, the average hue increases by 4.9 at a time point 725 when 0.3 seconds have elapsed. Since both the changes in the number of skin color pixels and the average hue satisfy the condition 1) at the time point when 0.3 seconds have elapsed, the reinitialization is performed. The skin color threshold settings are cleared, and the biometric determination start time is updated, and the amount of change in the average hue over time (so far) is excluded from the target of the biometric determination processing. The skin color thresholds are reset based on the next image. An image 732 is the result of detecting the skin color area using the reset skin color thresholds. In the graph 722, the biometric score drops to 0 once at a time point 727 when 0.3 seconds have elapsed.

After the reinitialization is performed when 0.3 seconds have elapsed, the number of skin color pixels in the graph 720 drops once and does not change much until reaching a time point 724 when 1.3 seconds have elapsed. In the graph 721, the average hue changes greatly even after the reinitialization. In the graph 720, the number of skin color pixels changes by 9% at the time point 724 after a lapse of 1 seconds from the reinitialization, i.e., a lapse of 1.3 seconds. In the graph 721, the average hue changes by 4.2 after a lapse of 1 seconds from the reinitialization. Since the amount of change in the average hue after a lapse of 1 seconds from the reinitialization satisfies the condition 2), the reinitialization is performed. The skin color thresholds are reset based on the next image. An image 719 is the result of detecting the skin color area using the reset skin color thresholds. In the graph 722, the biometric score drops to 0 once at a time point 728 when 1.3 seconds have elapsed. In the graph 721, the average hue changes less after the reinitialization. Since the biometric determination start time is reset after a lapse of 1.3 seconds, the result of the biometric determination is output when the determination time of 6.3 seconds, which is indicated by a solid line 729, has elapsed. In the graph 722, the biometric score at a time point 730 is 3.48, which is higher than the threshold of 3.4 indicated by a broken line 731, and the person is thus determined to be a living body.

As described above, it is possible to perform the biometric determination processing more efficiently by changing the conditions concerning the amount of change in the color information and the period of performing the reinitialization. In the present exemplary embodiment, if the condition 1) is satisfied, i.e., if both of the changes in the number of skin color pixels and the average hue are greater than the respective specific values, the reinitialization is performed any number of times within the change observation time. If the condition 2) is satisfied, i.e., if either of the changes in the number of skin color pixels or the average hue is greater than the specific value, the reinitialization is performed when the change observation time has elapsed. Alternatively, in both of the case where the condition 1) is satisfied and the case where the condition 2) is satisfied, the reinitialization may be performed any number of times within the change observation time or may be performed only after the change observation time has elapsed.

As described above, by combining the conditions for the reinitialization, the biometric determination can be efficiently performed even in a situation where there is a change in the imaging conditions.

A third exemplary embodiment will be described. In the first and second exemplary embodiments, the reinitialization is performed to extend the determination time for the spoofing determination if the changes in the number of skin color pixels and the average hue are greater than the respective specific values. However, depending on the elapsed time and the result of the biometric determination, the determination time for the biometric determination may be reduced to advance the output of the determination result without performing the reinitialization. More specifically, a storage unit stores the biometric score of the time-series image in a predetermined time. In a case where the skin color thresholds are determined to be updated before the lapse of the determination time for the biometric determination processing, whether the person is a living body is determined based on the stored biometric score if a first time has elapsed in the biometric determination processing. On the other hand, if the first time has not elapsed, the skin color thresholds are updated and then whether the person is a living body is determined. The first time is less than the determination time for the biometric determination processing.

Figure 9:
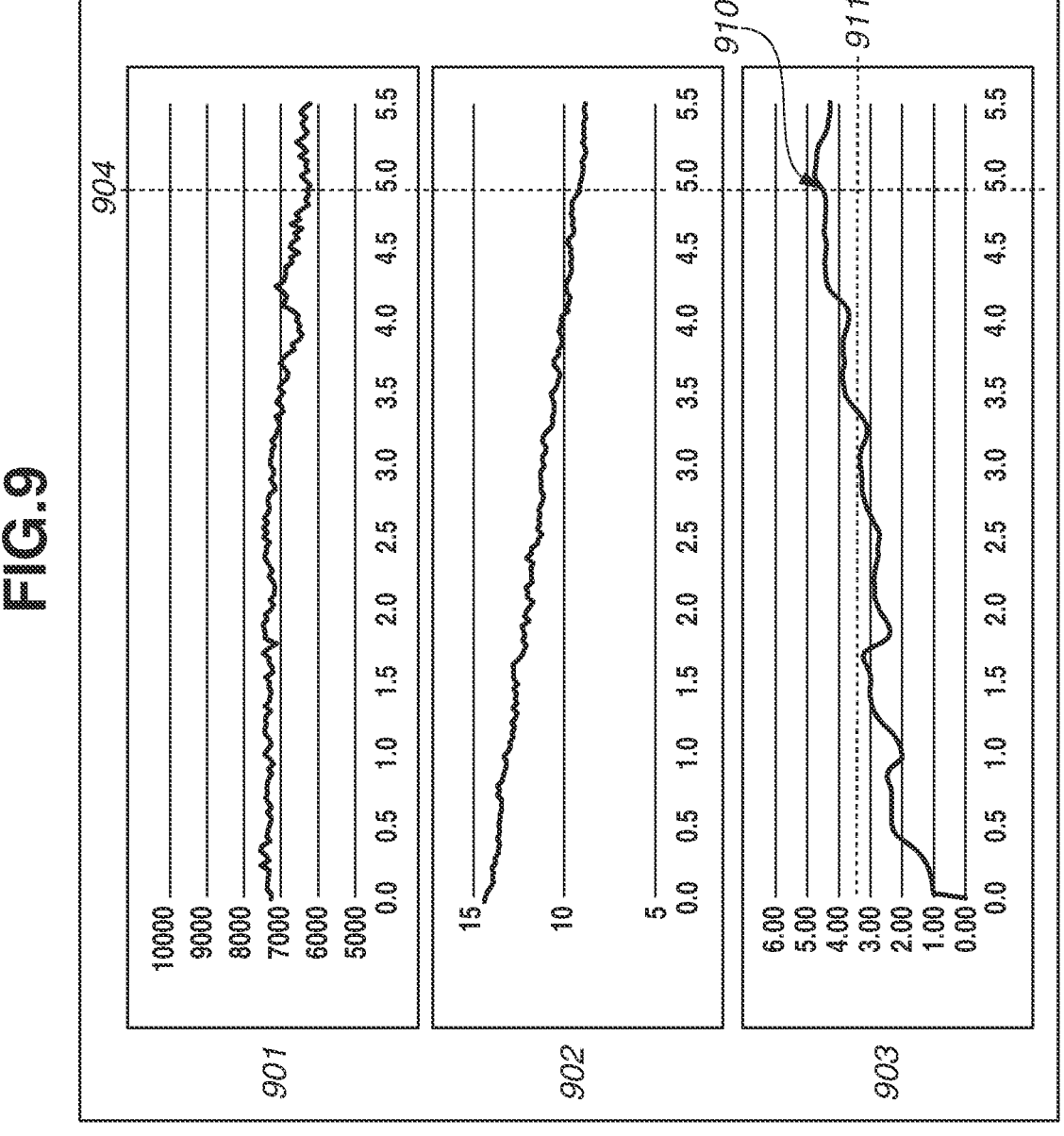
FIG. 9 is a diagram illustrating an example of biometric determination processing.

FIG. 9 illustrates graphs of changes in the color information and the biometric score over time in an example where automatic corrections slowly take effect and the number of skin color pixels and the average hue change gently. A graph 901 illustrates the number of skin color pixels, a graph 902 illustrates the average hue, and a graph 903 illustrates the biometric score. The number of skin color pixels and the average hue change gently, and the skin color thresholds become inappropriate at a time point (indicated by a broken line 904) immediately before the lapse of the determination time of 5 seconds for the biometric determination, i.e., at a time point when 4.9 seconds have elapsed. A biometric score 910 at this point is 4.6, which is higher than a threshold of 3.4 indicated by a broken line 911. In such a case, it is desirable to output the result of the biometric determination at this stage, instead of performing the reinitialization to extend the determination time for the biometric determination by 5 seconds to 9.9 seconds.

Figure 8:
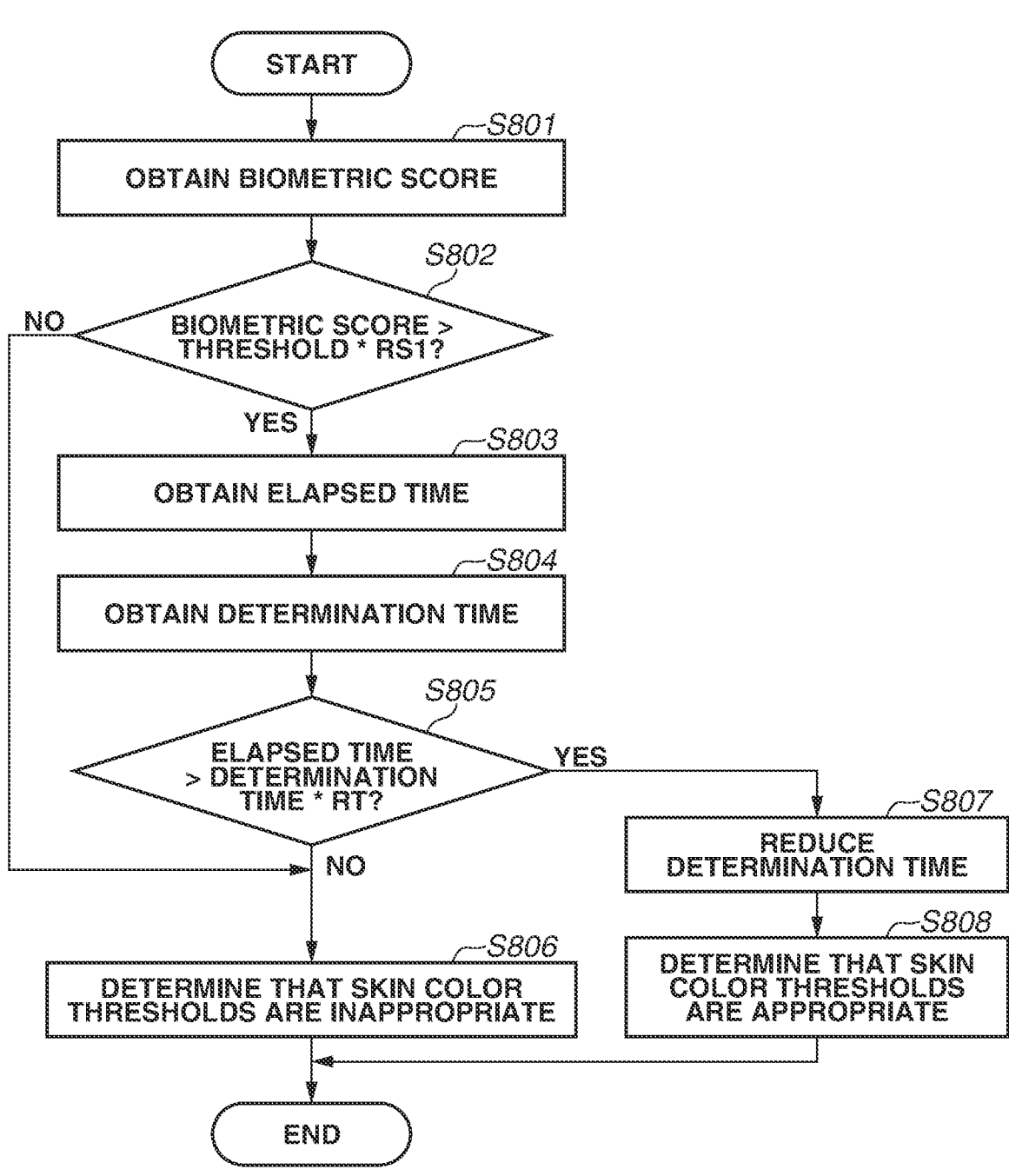
FIG. 8 is a flowchart illustrating processing performed by an image processing apparatus.

FIG. 8 is a flowchart illustrating processing performed by the image processing apparatus 1 according to the present exemplary embodiment. Processing for canceling the determination that the skin color thresholds are inappropriate is performed after the processing of steps S407 and S604 for determining that the skin color thresholds are inappropriate in FIGS. 4 and 6, respectively. The image processing apparatus 1 has a hardware configuration and a functional configuration similar to those in the first exemplary embodiment.

In step S801, the biometric determination unit 209 obtains the biometric score. In step S802, if the biometric determination unit 209 determines that the biometric score is greater than a living body threshold*RS1 (RS1>1) (YES in step S802), the processing proceeds to step S803. In step S803, the biometric determination unit 209 obtains the elapsed time. In step S804, the biometric determination unit 209 obtains the determination time for the biometric determination. In step S805, if the biometric determination unit 209 determines that the elapsed time is greater than the determination time*RT (RT<1) (YES in step S805), the processing proceeds to step S807. In step S807, the biometric determination unit 209 reduces the determination time to the elapsed time. In step S808, the biometric determination unit 209 redetermines that the skin color thresholds are appropriate, and the processing ends.

If the biometric determination unit 209 determines that the biometric score is less than or equal to the living body threshold*RS1 (RS1>1) (NO in step S802) or if the biometric determination unit 209 determines that the elapsed time is less than or equal to the determination time*RT (NO in step S805), the processing proceeds to step S806. In step S806, the biometric determination unit 209 determines that the skin color thresholds are inappropriate, and the processing ends.

If the skin color thresholds are determined to be appropriate in this flowchart, the determination time is reduced to the elapsed time. In step S312 of FIG. 3, the determination time is determined to have elapsed, and the output of the result is advanced.

In step S310, the skin color thresholds are determined before the biometric determination in step S311. The biometric score used in step S310 is the value based on the previous image. Steps S310 and S311 may be reversed in order so that the current biometric score is used.

While the biometric score is used to determine whether the result of the biometric determination is reliable, other reliability indices may be used. For example, if a living body/nonliving body binary classifier is used and the likelihood is unable to be measured, the numbers of living bodies and nonliving bodies obtained as results of consecutive determinations may be compared, and the reliability may be determined based on whether there is a significant difference between the numbers.

As described above, for example, a case where the reinitialization is performed in a stage where the biometric determination processing has been performed beyond 80% of the determination time can be prevented. This makes it possible to reduce the time taken for the biometric determination processing, and perform the biometric determination processing efficiently.

A fourth exemplary embodiment deals with an example where a threshold for the amount of change in the color information to be used for determining whether to perform the reinitialization is dynamically changed. In general, if the threshold for the amount of change in the color information is reduced, the biometric determination processing can be flexibly performed in response to the camera's automatic correction. However, unnecessary reinitialization due to face movement can be performed. By contrast, if the threshold for the amount of change in the color information is increased, the biometric determination processing can be vulnerable to noise other than a change in skin color due to a change in blood flow. In the present exemplary embodiment, the threshold (PdT or HdT) for the amount of change in the color information is set to a value (PdT1 or HdT1, where PdT1>PdT and HdT1>HdT) greater than the initial value after the reinitialization is performed. This suppresses the reinitialization. Moreover, if the biometric determination is determined to be worth reconsideration after the lapse of a specific time, the processing time of the biometric determination processing is extended.

Figure 11:
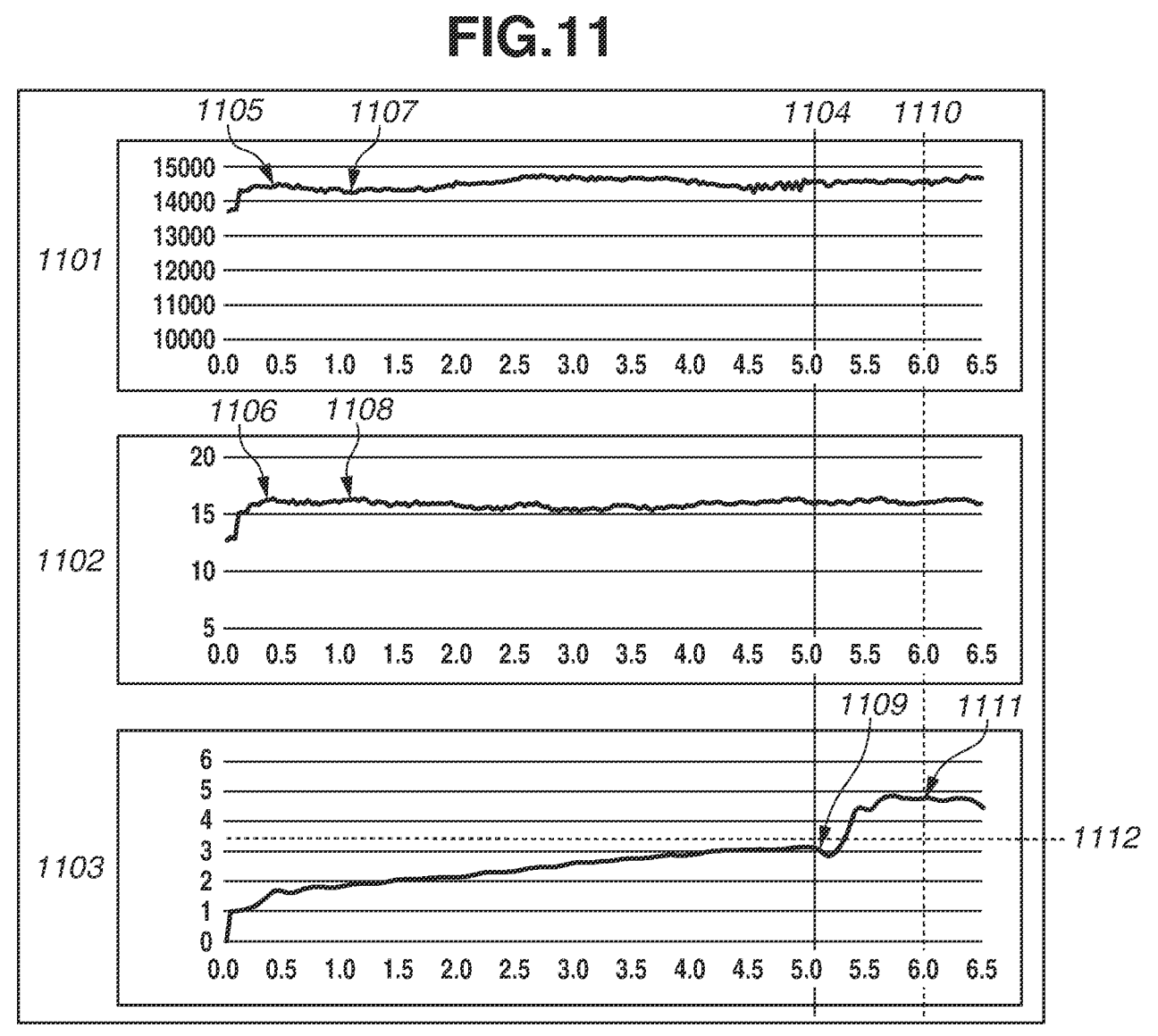

FIG. 11 illustrates an example of changes in the color information and the biometric score over time according to the present exemplary embodiment. A graph 1101 illustrates the number of skin color pixels, a graph 1102 illustrates the average hue, and a graph 1103 illustrates the biometric score. In this example, the following two conditions 1) and 2) are used as conditions for the reinitialization:

1) The number of skin color pixels changes by more than 14% and the average hue changes by more than 2 in a predetermined time of 3 seconds, and 2) When a predetermined time of 1 seconds has elapsed, the number of skin color pixels changes by more than 30% or the average hue changes by more than 5.

In the graph 1101, the change in the number of skin color pixels in a period from the start to a time point 1105 after a lapse of 0.3 seconds is 6%. In the graph 1102, the change in the average hue in a period from the start to a time point 1106 is 3.5. Thus, the condition 1) is not satisfied. In the graph 1101, the change in the number of skin color pixels at a time point 1107 after a lapse of 1 seconds is 5%. In the graph 1102, the change in the average hue at a time point 1108 after a lapse of 1 seconds is 3.23. Thus, the condition 2) is not satisfied, either. In the graph 1103, the biometric score at a time point 1109 after the determination time of 5 seconds have elapsed is 3.18, which is lower than a threshold of 3.4 indicated by a broken line 1112. In such a situation alone, the person is determined to be a nonliving body.

Figure 10:
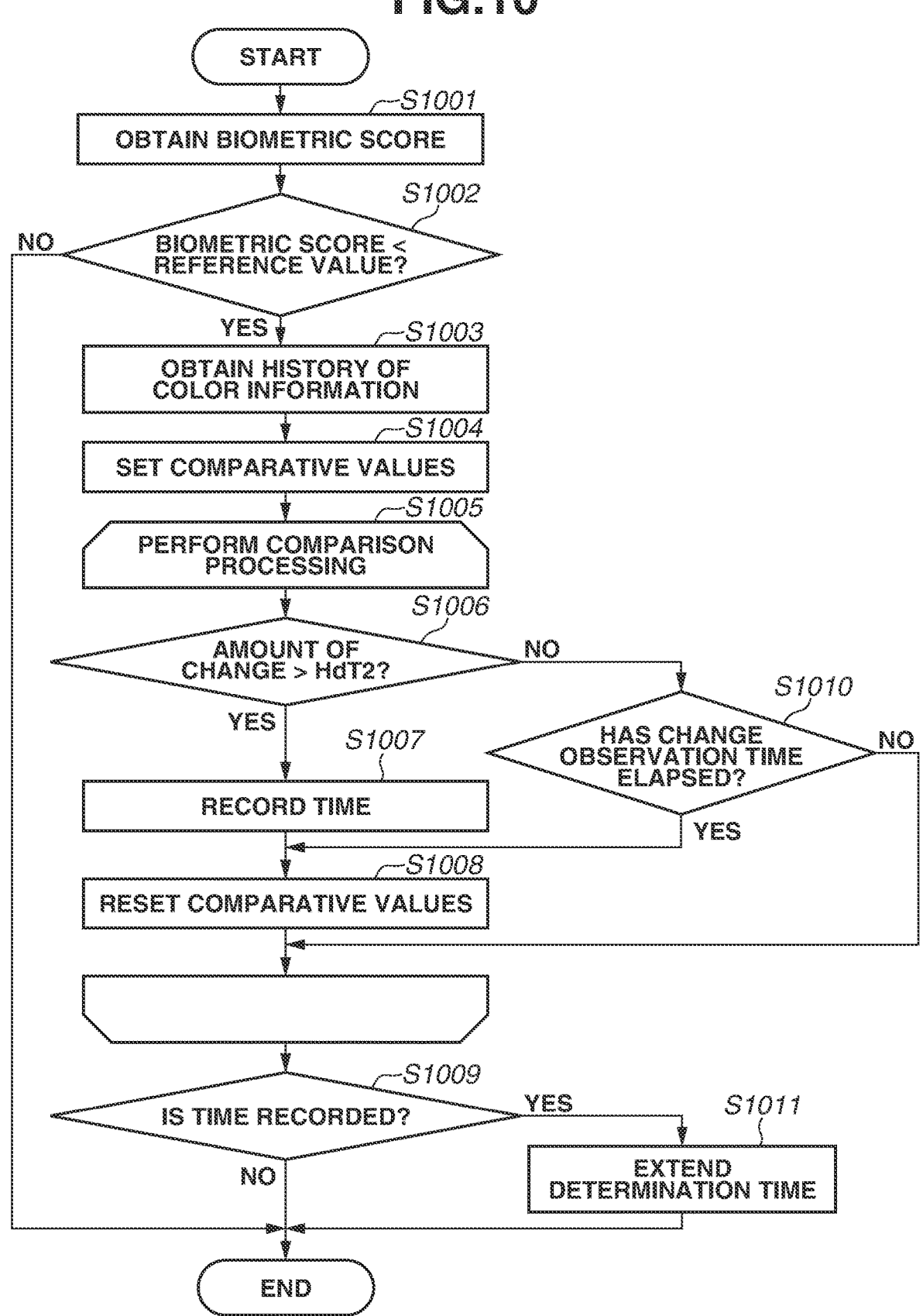
FIG. 10 is a flowchart illustrating processing performed by an image processing apparatus.

FIG. 10 is a flowchart illustrating processing performed by the image processing apparatus 1 according to the present exemplary embodiment. Processing for determining whether to extend the determination time for the biometric determination can be inserted after the determination time is determined to have elapsed (YES in step S312) in the flowchart of FIG. 3. If the determination time is determined to be extended, the processing returns to step S302 of FIG. 3. If the determination time is not determined to be extended, the processing proceeds to step S313 to output the result. The image processing apparatus 1 has a hardware configuration and a functional configuration similar to those in the first exemplary embodiment except for some of the processing.

The processing of FIG. 10 is started if the determination time of 5 seconds for the spoofing determination has elapsed without performing the reinitialization. In step S1001, the biometric determination unit 209 obtains the biometric score. In step S1002, the biometric determination unit 209 determines whether the biometric determination is worth reconsideration. For example, the biometric determination unit 209 determines whether the biometric score is lower than a reference value. The biometric determination may be determined to be worth reconsideration if the biometric score falls within a predetermined reference range. Cases where the biometric score is too low may be excluded. If the biometric determination is determined to not worth reconsideration (NO in step S1002), the processing ends. In FIG. 11, the biometric score at a time point indicated by a solid line 1104 is 3.18, which is a value slightly less than the threshold of 3.4 indicated by the broken line 1112. In this example, the biometric determination is determined to be worth reconsideration.

If the biometric score is determined to be worth reconsidering the biometric determination (YES in step S1002), the processing proceeds to step S1003. In step S1003, the biometric determination unit 209 obtains a history of the color information about the skin color area used for the biometric determination. At this time, the biometric determination unit 209 obtains the value of the number of skin color pixels in the graph 1101 and the value of the average hue in the graph 1102 in a period from the start to the time point (indicated by the solid line 1104) representing the determination time for the biometric determination in FIG. 11. In step S1004, the biometric determination unit 209 sets the values at the start position as comparative values. At this time, the biometric determination unit 209 also changes the threshold (PdT or HdT, where PdT1>PdT and HdT1>HdT) for the amount of change in the color information to a smaller value (PdT2 or HdT2, where PdT2<PdT<PdT1 and HdT2<HdT<HdT1). In this example, the biometric determination unit 209 lowers the threshold for the amount of change in the average hue in the condition 2) from 5 to 3.

In step S1005, the biometric determination unit 209 performs processing for comparing the current values with the foregoing comparative values, using the values in the history of the color information in the period from the start time to when the predetermined time has elapsed as the current values. In step S1006, the biometric determination unit 209 determines whether the amount of change in the average hue obtained by the comparison is greater than the threshold (HdT2). This processing can be replaced with the processing illustrated in FIG. 4 or 6. If the skin color thresholds are determined to be inappropriate, the amount of change is determined to be greater. If the skin color thresholds are determined to be appropriate, the amount of change is determined to be not greater. In the example of FIG. 11, if the threshold (HdT2) for determining the amount of change in the average hue to be greater is 3.0, the amount of change in the average hue is determined to be greater after the lapse of the predetermined time of 1 seconds based on the condition 2).

If the amount of change is determined to be greater than the threshold (Hdt2) (YES in step S1006), the processing proceeds to step S1007. In step S1007, the biometric determination unit 209 records the time. In step S1008, the biometric determination unit 209 resets the average hue and the number of skin color pixels at that time to the comparative values. The processing then continues. If a large change is found at a plurality of time points, the last time is recorded.

If the amount of change is determined to be not greater than the threshold (Hdt2) (NO in step S1006), the processing proceeds to step S1010. If the predetermined time (the change observation time) has elapsed (YES in step S1010), the processing proceeds to step S1008. In step S1008, the biometric determination unit 209 resets the comparative values to the values before the lapse of the predetermined time (the change observation time).

After the entire history of the color information within the determination time is processed, the processing proceeds to step S1009. In step S1009, the biometric determination unit 209 determines whether time recording is performed. If time recording is performed (YES in step S1009), the processing proceeds to step S1011. In step S1011, the biometric determination unit 209 extends the determination time for the biometric determination by the recorded time. The processing then ends. The amount of change in the average hue over time to be used for the biometric determination remains constant even if the determination time for the spoofing determination is extended. Extending the determination time for the biometric determination excludes the noise-containing portion from the target of the biometric determination, whereby the correct result can be obtained. In the graph 1103 of FIG. 11, a biometric score 1111 is 4.82 when the extended determination time indicated by a broken line 1110, i.e., 6.0 seconds have elapsed, which is higher than the threshold of 3.4 indicated by the broken line 1112, and the person is thus determined to be a living body.

As described above, it is possible to perform the biometric determination processing more efficiently by dynamically changing the threshold for the color information to be used as the reinitialization condition.

All the image data used for the biometric determination may be stored, and if the biometric determination is determined to be worth reconsideration, the biometric determination may be performed again with the reinitialization threshold lowered.

A fifth exemplary embodiment deals with examples of a graphical user interface (GUI) for the biometric determination processing. The image processing apparatus 1 described above may present the time progress of the biometric determination from the start to the end to the user.

If the reinitialization occurs, the time progress is rewound. In performing the reinitialization, the image processing apparatus 1 may also present the cause of the reinitialization to the user. This offers greater convenience to the user because the user can recognize the progress and impediment of the biometric determination processing.

Figures 12A, 12B, 12C:
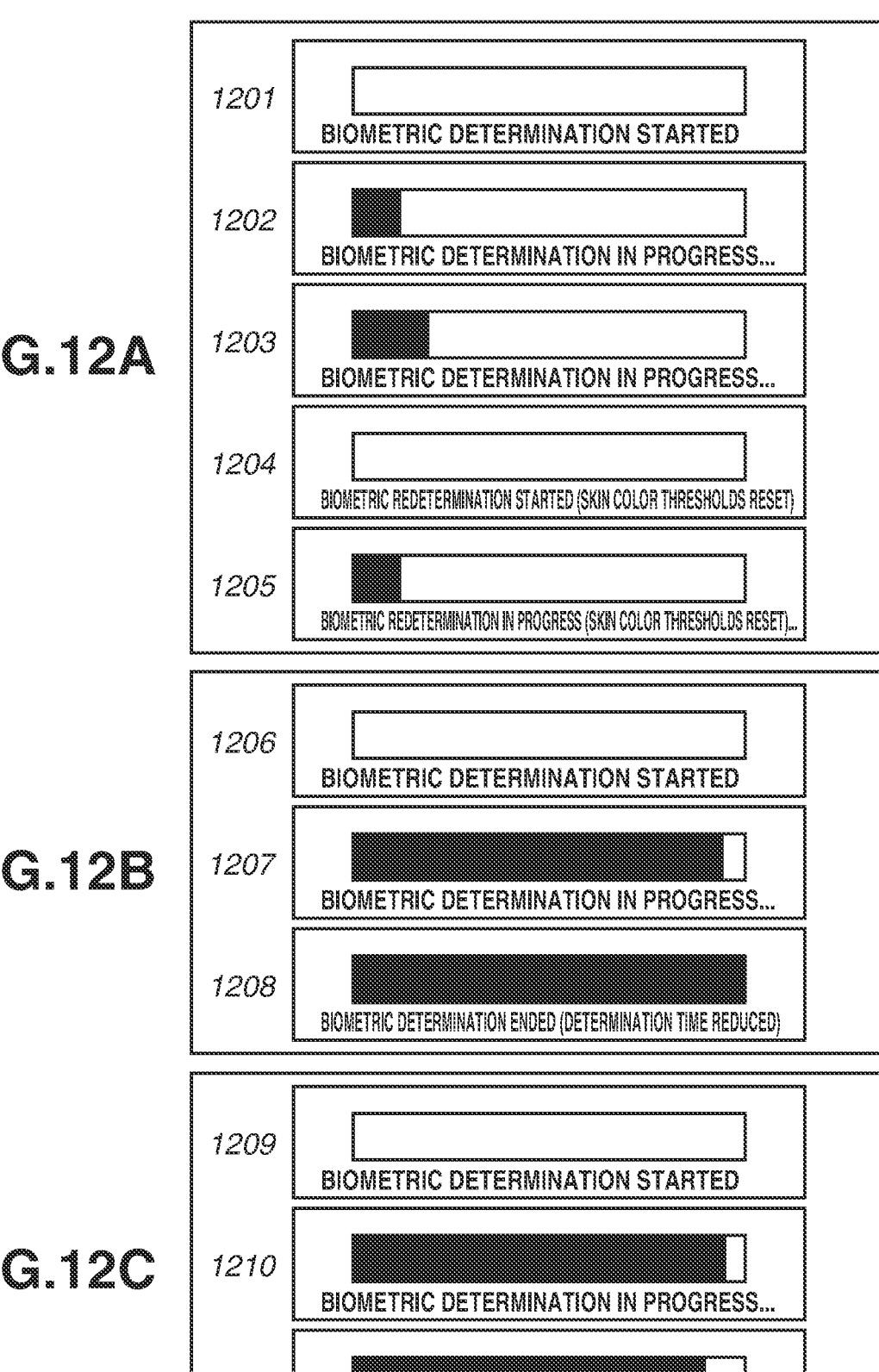
FIGS. 12A to 12C illustrate examples of a graphical user interface (GUI) indicating progress of biometric determination processing.

FIGS. 12A to 12C illustrate examples of the presentation. The image processing apparatus 1 outputs the result of the biometric determination processing and the time progress of the biometric determination processing using the result output unit 210. FIG. 12A illustrates display examples of a progress bar in a case where the reinitialization occurs. A progress bar 1201 is displayed at the start of the biometric determination. Progress bars 1202 and 1203 are displayed while the biometric determination is in progress. The reinitialization occurs while the progress bar 1203 is displayed. A progress bar 1204 displays a message "biometric redetermination started (skin color thresholds reset)", which indicates that the redetermination is started with a redetermination time of five seconds because the skin color thresholds are reset. A progress bar 1205 displays the progress during the redetermination time. If the reinitialization occurs, the entire range of the display time may be changed to the reinitialization time+the determination time, and the progress may be displayed as the elapsed time/(the reinitialization time+the determination time) instead of being reset to 0 like the progress bar 1204.

FIG. 12B illustrates display examples of a progress bar in a case where the determination time for the biometric determination is reduced. A progress bar 1206 is displayed at the start of the biometric determination. A progress bar 1207 is displayed while the biometric determination is in progress. If the determination time is reduced while the progress bar 1207 is displayed, a progress bar 1208 is displayed with a message "biometric determination ended (determination time reduced)", which indicates that the determination time is reduced and the output of the result is advanced.

FIG. 12C illustrates display examples of a progress bar in a case where the determination time for the biometric determination is extended. A progress bar 1209 is displayed at the start of the biometric determination. A progress bar 1210 is displayed while the biometric determination is in progress. If the determination time is reached and determined to be extended while the progress bar 1210 is displayed, a progress bar 1211 is displayed instead of presenting a message "biometric determination ended". The progress bar 1211 displays a message "biometric determination in progress (determination time extended) . . . " and presents (the determination time–the extended time)/the determination time as the current progress. The change in the number of skin color pixels or the change in the average hue may be explicitly displayed as the cause of the change of the determination time.

An exemplary embodiment of the present disclosure can also be implemented by performing the following processing. Software (program) for implementing the functions according to the foregoing exemplary embodiments is supplied to a system or an apparatus via a data communication network or various storage media. A computer (or a CPU or a microprocessing unit (MPU)) of the system or the apparatus then reads and executes the program.

The program may be recorded on a computer-readable recording medium and provided.

Of the foregoing processing units, the face detection unit 202 may be replaced with a model trained by machine learning, and the processing may be performed using the trained model. In such a case, for example, a plurality of combinations of input data and output data to and from the processing unit are prepared as training data. Machine learning is performed to acquire knowledge from the training data, and a trained model that outputs the output data corresponding to the input data as a result is generated based on the acquired knowledge. For example, a neural network model can be used to construct the trained model. The trained model performs the processing of the processing unit by operating in cooperation with the CPU 11 or a graphics processing unit (GPU), as a program for performing processing equivalent to that of the processing unit. The trained model may be updated as appropriate after some processing.

According to an exemplary embodiment of the present disclosure, the biometric determination can be efficiently performed even in a situation where there is a change in imaging conditions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-037601, filed Mar. 10, 2022, which is hereby incorporated by reference herein in its entirety.

What is claimed is:

1. An image processing apparatus configured to determine whether a person in an image is a living body, the image processing apparatus comprising:

a processor; and a memory storing executable instructions which, when executed by the processor, cause the image processing apparatus to perform operations including:

acquiring time series images of the person;

determining a person-specific skin color threshold representing possible skin color ranges for the person in the acquired time series images using pixels corresponding to a predetermined region of the person which were acquired during a predetermined time period;

obtaining color information describing a skin color area in the predetermine region of person in the time-series image based on the determined person-specific skin color threshold;

updating, when an amount of change in the color information during a predetermined time exceeds a reference value, the person-specific skin color threshold by re-determining, based on an image acquired after said exceeding, a new person-specific skin color threshold for the person; and controlling, based on a result of a comparison between the obtained color information and biometric score indicating a likelihood that the person is a living body, whether to continue biometric determination processing that will determine whether the a person in the time-series image is a living body.

2. The image processing apparatus according to claim 1, wherein the time-series image targeted for the biometric determination processing is determined to be changed based on the amount of change in the color information.

3. The image processing apparatus according to claim 1, wherein the color information includes a number of pixels in the skin color area or an average hue of the pixels in the skin color area, and wherein in a case where an amount of change in at least either the number of pixels in the skin color area or the average hue of the pixels in the skin color area in the predetermined time period is greater than or equal to respective predetermined values, the biometric determination processing is determined to be initialized.

4. The image processing apparatus according to claim 3, wherein whether the amount of change in the number of pixels in the skin color area is greater than or equal to a first predetermined value is determined based on a maximum value and a minimum value of the number of pixels in the skin color area in the time-series image acquired during the predetermined time period.

5. The image processing apparatus according to claim 3, wherein whether the amount of change in the number of pixels in the skin color area is greater than or equal to a first predetermined value is determined based on the number of pixels in the skin color area in the time-series image at a start of the predetermined time period and the number of pixels in the skin color area in the time-series image at an end of the predetermined time period.

6. The image processing apparatus according to claim 3, wherein whether the amount of change in the average hue of the pixels in the skin color area is greater than or equal to a second predetermined value is determined based on the average hue of the pixels in the skin color area in the time-series image at a start of the predetermined time period and the average hue of the pixels in the skin color area in the time-series image at an end of the predetermined time period.

7. The image processing apparatus according to claim 3, wherein whether the amount of change in the number of pixels in the skin color area included in the color information in a different predetermined time period which is shorter than the predetermined time period is greater than a first predetermined value is determined.

8. The image processing apparatus according to claim 3, wherein in a case where the biometric determination processing is initialized, the respective predetermined values are changed.

9. The image processing apparatus according to claim 1, wherein in the biometric determination processing, a pulse rate of the person is estimated based on the amount of change in the color information.

10. The image processing apparatus according to claim 8, wherein in the biometric determination processing, in a case where the biometric score indicating the likelihood of the person being a living body is higher than or equal to a specific value, the person is determined to be a living body, and in a case where the score is lower than the specific value, the person is determined to be not a living body.

11. The image processing apparatus according to claim 10, wherein the score is estimated based on a pulse rate estimated based on the average hue included in the color information.

12. The image processing apparatus according to claim 10, wherein execution of the instructions further configures the image processing apparatus to perform operations including recording the biometric score associated the time-series image in the predetermined time period, wherein in the biometric determination processing, in a case where the person-specific skin color threshold is determined to be updated before a lapse of a determination time for the biometric determination processing and a first time has elapsed, whether the person is a living body is determined based on the recorded score, and wherein in the biometric determination processing, in a case where the person-specific skin color threshold is determined to be updated before the lapse of the determination time for the biometric determination processing and the first time has not elapsed, the threshold is updated and then whether the person is a living body is determined.

13. The image processing apparatus according to claim 1, wherein in a case where the biometric determination processing is initialized, the biometric determination processing is determined to be continued until a standby time elapses.

14. The image processing apparatus according to claim 1, wherein execution of the instructions further configures the image processing apparatus to perform operations including outputting a determination result of the biometric determination processing.

15. The image processing apparatus according to claim 14, wherein time progress of the biometric determination processing is output.

16. An image processing method for determining whether a person in an image is a living body, the image processing method comprising:

acquiring time series images of the person;

determining a person-specific skin color threshold representing possible skin color ranges for the person in the acquired time series images using pixels corresponding to a predetermined region of the person which were acquired during a predetermined time period;

obtaining color information describing a skin color area in the predetermine region of person in the time-series image based on the determined person-specific skin color threshold;

updating, when an amount of change in the color information during a predetermined time exceeds a reference value, the person-specific skin color threshold by re-determining, based on an image acquired after said exceeding, a new person-specific skin color threshold for the person; and controlling, based on a result of a comparison between the obtained color information and biometric score indicating a likelihood that the person is a living body, whether to continue biometric determination processing that will determine whether the a person in the time-series image is a living body.

17. A non-transitory computer-readable storage medium storing instructions that, when executed by a processor, configures the processor to perform an image processing method for determining whether a person in an image is a living body, the image processing method comprising:

acquiring time series images of the person;

determining a person-specific skin color threshold representing possible skin color ranges for the person in the acquired time series images using pixels corresponding to a predetermined region of the person which were acquired during a predetermined time period;

obtaining color information describing a skin color area in the predetermine region of person in the time-series image based on the determined person-specific skin color threshold;

updating, when an amount of change in the color information during a predetermined time exceeds a reference value, the person-specific skin color threshold by re-determining, based on an image acquired after said exceeding, a new person-specific skin color threshold for the person; and controlling, based on a result of a comparison between the obtained color information and biometric score indicating a likelihood that the person is a living body, whether to continue biometric determination processing that will determine whether the person in the time-series image is a living body.

* * * * *